United States Patent

Barker

[11] Patent Number: 6,026,800
[45] Date of Patent: Feb. 22, 2000

[54] PORTABLE HEATER AND COOKER SYSTEM

[76] Inventor: Stanley Grant Barker, 607 Madison St., Joliet, Ill. 60435

[21] Appl. No.: 09/159,063

[22] Filed: Sep. 23, 1998

[51] Int. Cl.[7] ........................................ F24C 3/12
[52] U.S. Cl. ............................ 126/4; 126/85 B; 126/59; 126/42; 431/79
[58] Field of Search ............................ 126/4, 91 R, 92 R, 126/853, 59, 42; 431/79

[56] References Cited

U.S. PATENT DOCUMENTS

| | | | |
|---|---|---|---|
| 1,785,263 | 12/1930 | Jensen | 126/85 B |
| 2,841,133 | 7/1958 | Schwank | 126/4 |
| 3,085,350 | 4/1963 | Waters | 126/4 |
| 3,381,678 | 5/1968 | Fry | 126/4 |
| 4,774,931 | 10/1988 | Urso | 126/59 |
| 4,860,726 | 8/1989 | Barker . | |
| 4,972,823 | 11/1990 | Stadin . | |
| 5,165,883 | 11/1992 | Van Bremmel | 126/96 |
| 5,445,137 | 8/1995 | Crews . | |
| 5,467,760 | 11/1995 | Cox . | |
| 5,562,808 | 10/1996 | Valters et al. | 126/85 B |
| 5,715,808 | 2/1998 | Wilhoite | 126/85 B |
| 5,785,512 | 7/1998 | Cormier | 431/79 |

FOREIGN PATENT DOCUMENTS 2103352  2/1983  United Kingdom ................... 126/42

*Primary Examiner*—Ira S. Lazarus
*Assistant Examiner*—Sara Clarke

[57] ABSTRACT

A portable heater and cooker system is provided to apply radiant and conductive heat from a heating component to an enclosure area or a cooking utensil, using a heat generated chimney effect and manual manipulation. In addition, user safety is assured with an oxygen depletion sensor and a ventilating panel for the enclosure.

16 Claims, 5 Drawing Sheets

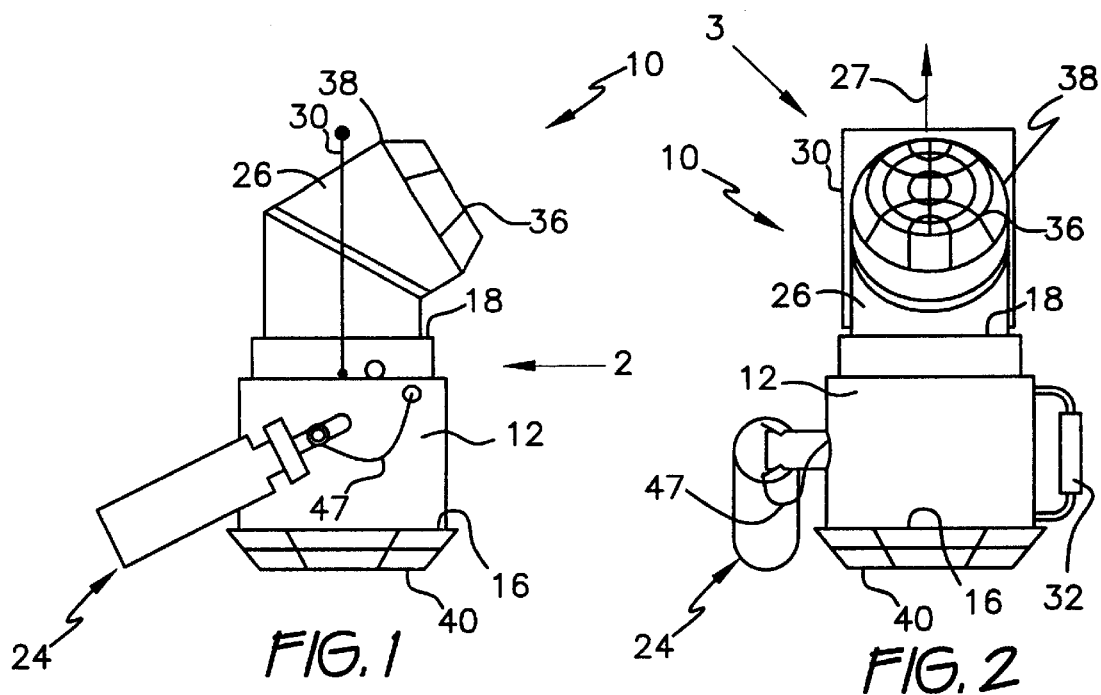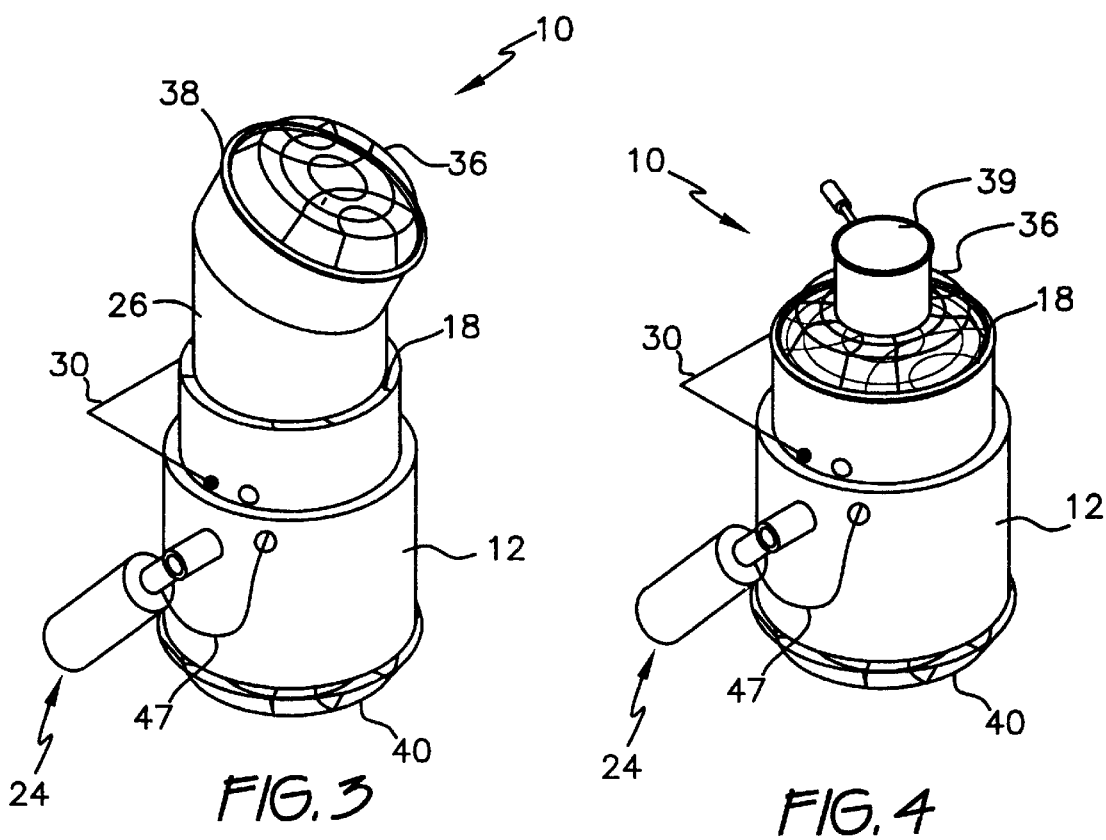

PORTABLE HEATER AND COOKER SYSTEM

BACKGROUND OF THE INVENTION

1. Field of the Invention

The present invention relates to heating devices. More particularly, the invention comprises a portable heater and cooker system, which relates generally for remote use, and for utility applications, also for comfort heating of tents or small enclosures such as cabs, trailers, fish huts, etc., and also for personal warmth and cooking applications.

2. Description of the Prior Art

Heating devices have had shortcomings in safety, convenience and versatility. Present heating devices consume oxygen from the room when the heating devices are used indoors, possibly causing a lack of oxygen with dangerous consequences. Based on health effects, an average healthy adult should not be exposed to oxygen levels below sixteen percent at sea level.

Numerous heating devices are shown in U.S. Pat. No. 4,860,726, issued to Stanley G. Barker on Aug. 29, 1989, U.S. Pat. No. 4,972,823, issued to Arne H. Stadin on Nov. 27, 1990, U.S. Pat. No. 5,445,137, issued to Paul B. Crews on Aug. 29, 1995, and U.S. Pat. No. 5,467,760, issued to John H. Cox on Nov. 21, 1995, all of which relate to heating devices.

U.S. Pat. No. 4,860,726 to Barker, teaches a multipurpose warming and heating vessel with a versatility in its configurations to be adaptable to supply heat for different warming for the body, limited food warming and cooking applications, as well as the ability to dispense warming heat to service any useful purpose, by means of its flexible discharge tube. The present invention is different from this vessel in that it is a safe heater for small enclosures and permits the targeting of certain objects or areas requiring heat, without exposing them to flame impingement or torch heat.

U.S. Pat. No. 4,972,823 to Stadin, teaches a safety stove and burner assembly which is safe for use in both cooking and heating in close quarters and explosive atmospheres. The present invention is different from this assembly since it is compact, portable, and lightweight.

U.S. Pat. No. 5,445,137 to Crews, teaches a backpacking stove for tent use that will protect the fabric of the tent from a heat source and safely and conveniently exhaust the excess heat, moisture and gases from the tent. The present invention is different from this stove, in that it has a safety feature which prevents the depletion of oxygen which could result in the production of deadly carbon monoxide.

U.S. Pat. No. 5,467,760 to Cox, teaches a portable sportsman furnace which permits ease of portability in utilization of the furnace structure of the invention in various sporting events, such as hunting, fishing and the like. The present invention is different from this furnace, since when heating smaller enclosures there will be warmer floor areas as the air is drawn up from the cold floor area by convection, thus drawing warmer air down from higher spaces.

None of the above inventions and patents, taken either singly or in combination, is seen to describe the instant invention as claimed.

SUMMARY OF THE INVENTION

The present invention is a portable heater and cooker system comprising a housing having a heating chamber with a bottom air inlet port and a top air outlet port. A heating component is provided having a structure for mounting the heating component within the heating chamber of the housing. An assembly is provided for supplying a fuel air mixture to the heating component within the housing, so that heating component will produce heat in the heating chamber to create and promote convection establishing a chimney effect through the housing. An angle outlet duct is removably connected to a top air outlet port of the housing to convey hot air from the housing. A facility is provided for safely shutting down the heating component when there is a lack of oxygen for the heating component.

Accordingly, it is a principal object of the invention a portable heater and cooker system that will overcome the shortcomings of the prior art devices.

An additional object of the invention is to provide a portable heater and cooker system that is a safe heater for small enclosures, also to permit the targeting of certain objects or areas requiring heat, without exposing them to flame impingement or torch heat.

A further object of the invention is to provide a portable heater and cooker system that is compact, portable and lightweight.

Still yet a further object of the invention is to provide a portable heater and cooker system that does not require a high voltage power supply.

Another object of the invention is to provide a portable heater and cooker system that has a safety feature to prevent the depletion of oxygen which could result in the production of deadly carbon monoxide.

Still yet another object of the invention is to provide a portable heater and cooker system in which the safety feature, being an oxygen depletion sensor, can be retrofit to existing heaters.

Still yet a further object of the invention is to provide a portable heater and cooker system that is simple and easy to use.

Yet another object of the invention is to provide a portable heater and cooker system that is versatile.

Still yet another object of the invention is to provide a portable heater and cooker system that with a simple revision can be used for cooking.

A further object of the invention is to provide a portable heater and cooker system, so that when heating smaller enclosures, will circulate air about the enclosure by convection, drawing colder air in and up from the floor to be heated.

Still yet another object of the invention is to provide a portable heater and cooker system that is economical in cost to manufacture.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 1 is a side view of the present invention.

FIG. 2 is a front view taken in the direction of arrow 2 in FIG. 1.

FIG. 3 is a perspective view taken in the direction of arrow 3 in FIG. 2.

FIG. 4 is a perspective view similar to FIG. 3, with the angled outlet duct removed and the outlet grid in position for cooking.

DETAILED DESCRIPTION OF THE PREFERRED EMBODIMENTS

Figure 5A:
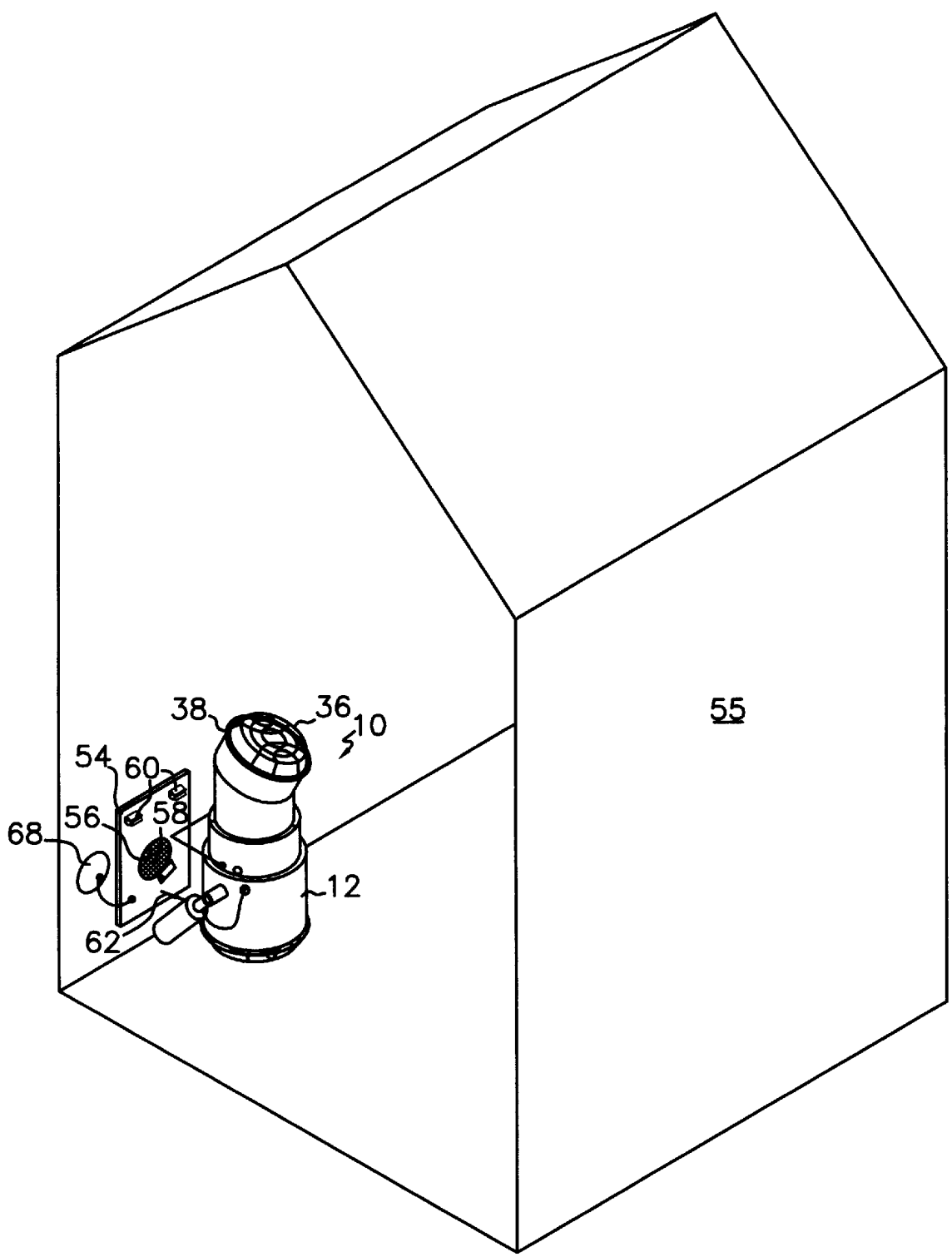
FIG. 5A is a perspective view similar to FIG. 3, showing a ventilating panel for small enclosure heating.

Turning now to the drawings, in which similar reference characters denote similar elements throughout the several views, FIGS. 1 through 7 illustrate the present invention, which is a portable heater and cooker system 10 comprising a housing 12 having a heating chamber 14, a bottom air inlet port 16 and a top air outlet port 18. A heating component 20 is provided. A mounting structure 22 is for mounting heating component 20 within heating chamber 14 of housing 12.

Figure 6:
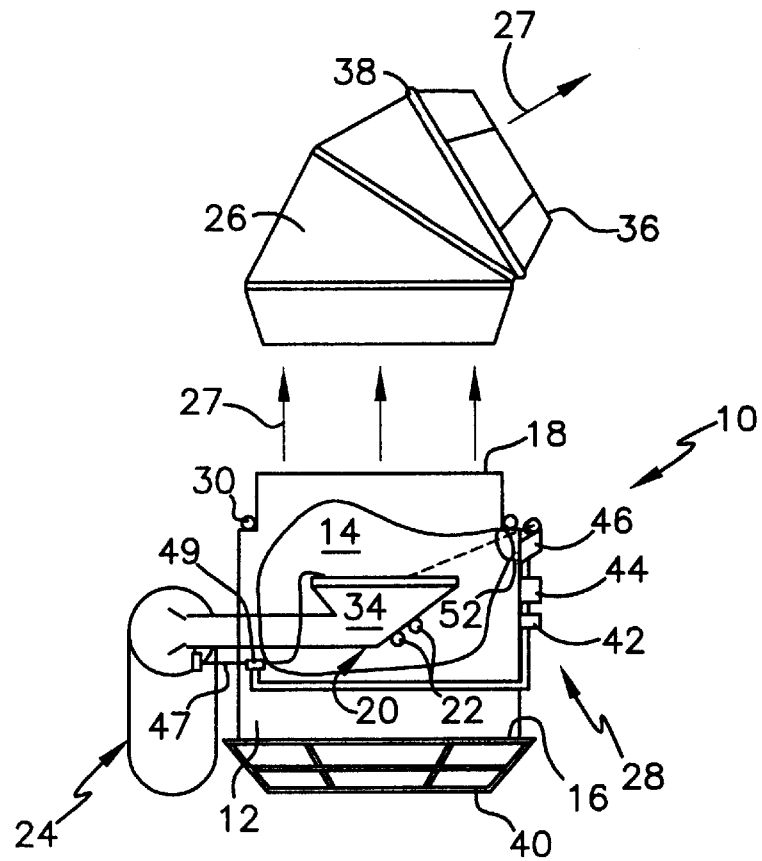
FIG. 6 is a cutaway front view with the angled outlet duct exploded therefrom.
Figure 7:
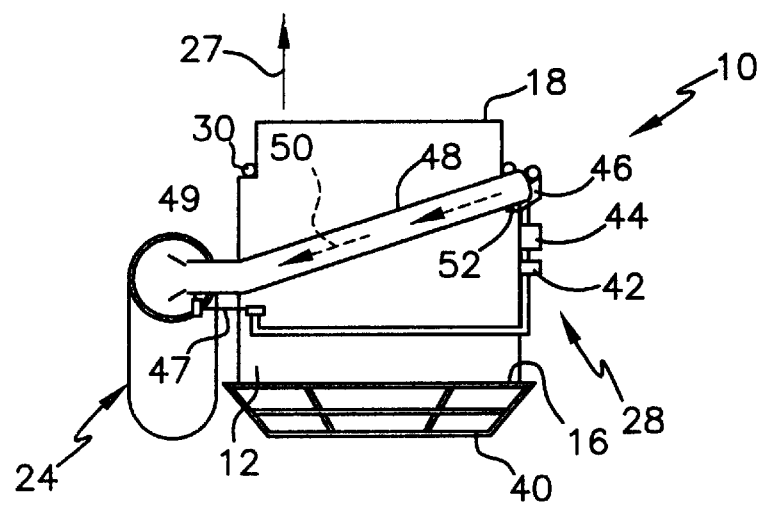
FIG. 7 is a front view with the angled outlet duct removed, showing a primary air tube to cool the oxygen depletion sensor.

Some heaters typically of the camping type have a wire frame (not shown) in place of a fully enclosed housing and heating chamber. The actual structure of the housing and heating chamber is not critical to the invention. Therefore, it will be understood that for the purposes of this invention, "housing" and "heating chamber" encompass the generally open structure of a wire frame as well as the continuous walls depicted herein. In a similar vein, air inlets and outlets need not be separate unto themselves, but will encompass any opening in the heating chamber passing air thereinto and out therefrom. A fuel assembly 24, exterior to housing 12, is provided for supplying a fuel air mixture to heating component 20, so that when heating component 20 produces heat in heating chamber 14, a chimney effect circulates air through housing 12. An angle outlet duct 26 is removably connected to top air outlet port 18 of housing 12, to redirect and convey hot air 27 from housing 12. A safety shut-down facility 28, shown in FIGS. 6 and 8, is provided for safely shutting down heating component 20 when there is a deficiency of oxygen for heating component 20.

A lift handle 30 is located on housing 12. A side hand grip 32, shown in FIG. 2, is on housing 12, so that housing 12 can be manually manipulated to heat various items. Heating component 20 is a radiant burner 34. An outlet grid 36 is provided. When angled outlet duct 26 is removed from top outlet port 18 of housing 12 and replaced by outlet grid 36, system 10 will be converted to a flat cooker, so that a standard cooking vessel 39 can be supported on outlet grid 36, as shown in FIG. 4.

Angled outlet duct 26 is adjustable upon top outlet port 18 of housing 12, to allow selective redirection of hot air 27. Outlet grid 36 is removably attached to an opening located at top 38 of angled outlet duct 26. An inlet grid 40 cooperates with bottom air inlet port 16 of housing 12, whereby protection from foreign elements is provided to the heating chamber 14 with heating component 20, without diminishing desired air movement through housing 12 created by the chimney effect.

Figure 8:
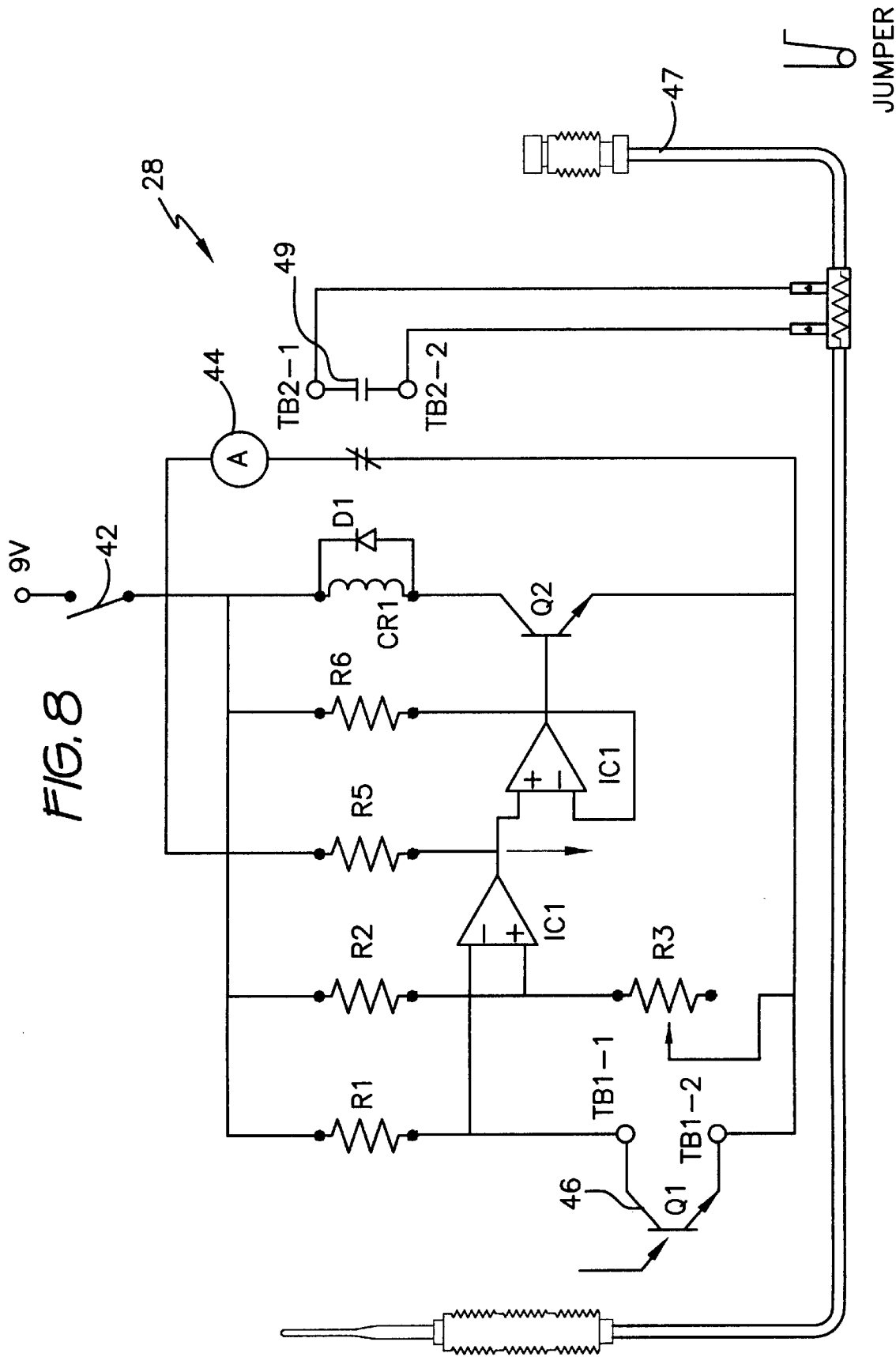
FIG. 8 is a schematic wiring diagram for the safety shut-down facility.

Safety shut-down facility 28, shown schematically in FIG. 8, wherein a suitable control circuit is illustrated, includes an on-off switch 42 and an audible alarm 44 activated by an oxygen depletion sensor 46, the latter being a light intensity responsive photocell. A dimming of a usual bright glow of heating component 20 indicates a lack of oxygen in the combustion air and is used as a safety cutoff point for heating component 20. Alternatively, any qualitative or substantial quantitative change in the radiant energy emitted during combustion may be monitored by a suitable sensor as the basis for determining when oxygen is nearing depletion. For example, hue of the flame may vary as percentage of oxygen in combustion air diminishes. In this example, the sensor may respond to hue rather than to brightness. Any measurable parameter of combustion indicative of oxygen depletion would be suitable for the purposes of this invention.

Oxygen depletion sensor 46 sends a signal to a thermocouple cut off circuit 47, which is connected to a fuel shut off solenoid valve 49 to cut off fuel. A jumper may be installed to close the circuit of solenoid valve 49 when it is deemed not necessary to monitor for oxygen depletion. Oxygen depletion sensor 46 includes a primary air tube 48, shown in FIG. 7, extending to fuel air mixture supply assembly 24, to prevent sensor 46 from overheating. The temperature of sensor 46 is kept below a critical point by a flow of cool air 50. If desired, sensor 46 may be protected from exposure to excessive heat by shielding (not shown) or by being located away from injurious heat.

Oxygen depletion sensor 46 optionally includes a clip 52, so that sensor 46 can be removably attached adjacent to heating component 20 in retrofit applications. Clip 52 is flexible, for enabling sensor 46 to be adapted to different locations on different housings 12.

FIG. 5A shows a ventilating panel 54 having an air inlet opening 56. Ventilating panel 54 is mounted into a wall of an enclosure, such as a tent 55. Panel 54 is placed against an opening formed in the enclosure. A securing assemblage, a gripping element such as clips 60, is provided for securing housing 12 adjacent to ventilating panel 54 (or panel 54A, shown in FIG. 5B), so that ventilating panel 54 (or 54A) will draw ambient air from outside the enclosure through air inlet opening 56, with panel 54 supported at the opening formed in the enclosure being heated. A screen 58 fits over air inlet opening 56 in ventilating panel 54 or 54A, to prevent insects and small animals from entering through air inlet opening 56. Clips 60 on ventilating panel 54 engage with lift handle 30 when pivoted down. A stabilizer rod 62 extends between ventilating panel 54 and housing 12.

Figure 5B:
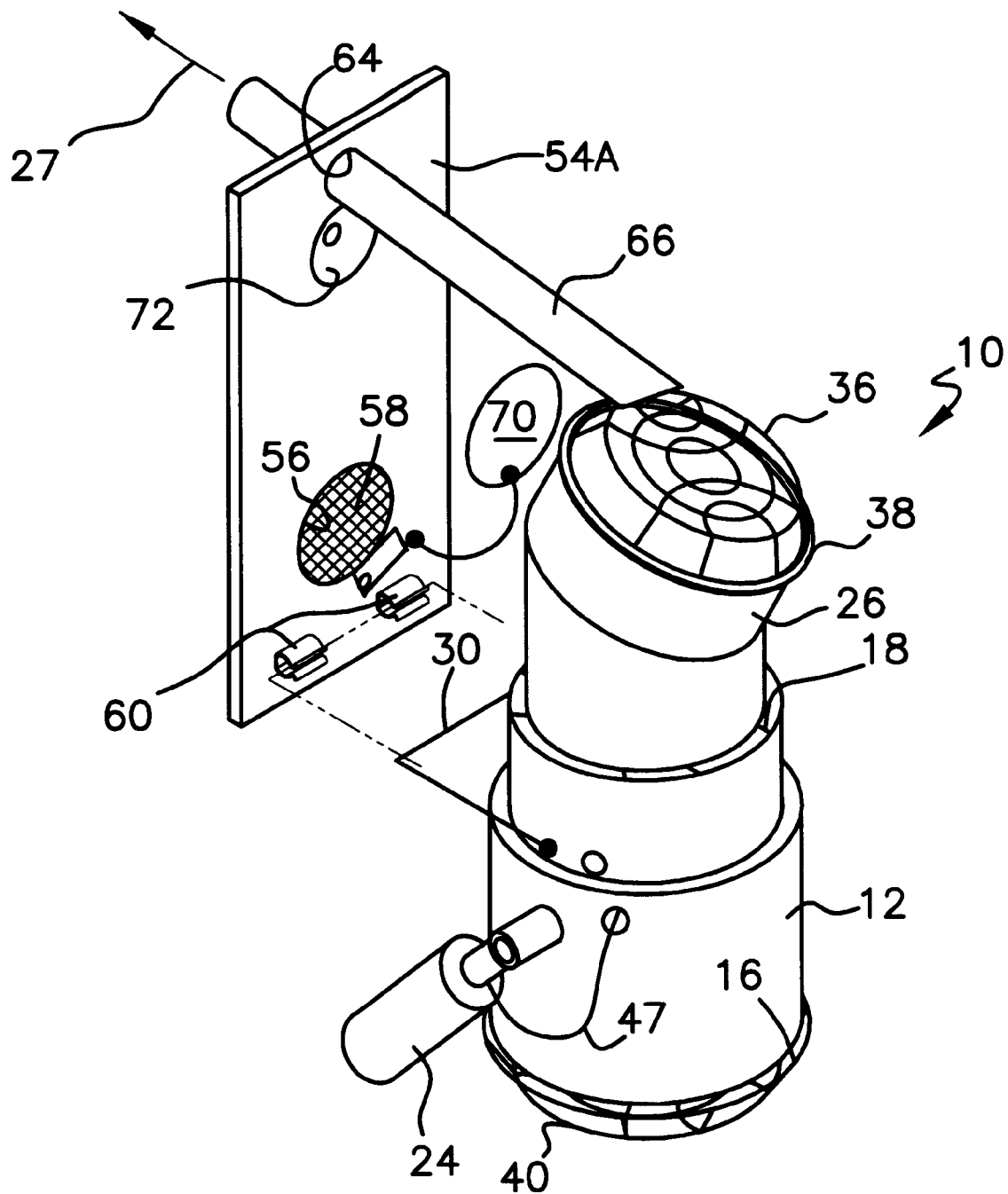
FIG. 5B is a perspective view similar to FIG. 5A, showing a modified ventilating panel and a vent tube in place for small enclosure heating.

FIG. 5B shows a modified ventilating panel 54A having a second air outlet opening 64. An upwardly inclined vent tube 66, connected at its lower end to top end 38 of outlet duct 26 extends through second air outlet opening 64 in ventilating panel 54A, so as to vent out some hot air 27 produced by heating component 20. This induces air circulation for ventilation.

A cover 68 in FIG. 5A is for capping air inlet opening 56 in ventilating panel 54, so as to maintain the integrity of the enclosure when portable heater and cooker system 10 is detached. In FIG. 5B, a first cover 70 is for capping air inlet opening 56 in ventilating panel 54A. A second cover 72 is for closing air outlet opening 64 in ventilating panel 54A, so as to maintain the integrity of the enclosure when portable heater and cooker system 10 and upwardly inclined vent tube 66 are detached.

It is to be understood that the present invention is not limited to the embodiments described above, but encompasses any and all embodiments within the scope of the following claims.

I claim:

1. A portable heater and cooker system for heating enclosures and cooking, comprising:
   a housing having a heating chamber, an air inlet port, and an air outlet port;
   a heating component disposed to produce heat within said heating chamber;
   a fuel supply element disposed to supply fuel and combustion air to said heating component; and
   a safety shut-down mechanism disposed to shut down said heating component responsive to detecting a deficiency of oxygen in the combustion air, wherein said safety shut-down mechanism comprises
      a light detector disposed to detect dimming of the glow of combustion within said heating component, and
      a valve disposed to shut off flow of fuel to said heating component responsive to detection of dimming of the glow of combustion.

2. A portable heater and cooker system as recited in claim 1, further including:
   a lift handle on said housing; and
   a side hand grip on said housing, so that said housing can be manually manipulated to heat various items.

3. A portable heater and cooker system as recited in claim 1, wherein said heating component is a radiant burner.

4. A portable heater and cooker system as recited in claim 1, further comprising:
   an outlet grid removably attached to said opening of said outlet duct; and
   an inlet grid cooperating with said bottom air inlet port of said housing, whereby protection from foreign elements is provided to said heating chamber by said heating component, without diminishing desired air movement through said housing created by the chimney effect.

5. A portable heater and cooker system as recited in claim 1, wherein said safety shut-down means includes an electrical on-off switch, an oxygen depletion sensor controlled by said on-off switch, and an audible alarm activated by said oxygen depletion sensor, whereby a change in radiant energy given off by said heating component indicates a lack of oxygen in the combustion air and is used as a safety cutoff point for said heating component.

6. A portable heater and cooker system for heating enclosures and cooking, comprising:
   a housing having a heating chamber, an air inlet port and a air outlet port;
   a heating component disposed to produce heat within said heating chamber;
   fuel means for supplying a fuel air mixture to said heating component, so that when said heating component produces heat in said heating chamber a chimney effect circulates air through said housing;
   safety shut-down means for shutting down said heating component when there is a deficiency of oxygen for said heating component; and
   an outlet grid mountable over said outlet port, whereby when said outlet grid is mounted over said outlet port, said system will be converted to a flat cooker, so that a standard cooking vessel can be supported upon said outlet grid.

7. A portable heater and cooker system for heating enclosures and cooking, comprising:
   a housing having a heating chamber, an air inlet port and a air outlet port;
   a heating component disposed to produce heat within said heating chamber;
   fuel means for supplying a fuel air mixture to said heating component, so that when said heating component produces heat in said heating chamber a chimney effect circulates air through said housing; and
   safety shut-down means for shutting down said heating component when there is a deficiency of oxygen for said heating component,
   wherein said outlet duct has means for being adjustably positioned upon said outlet port of said housing to allow selective redirection of hot air.

8. A portable heater and cooker system for heating enclosures and cooking, comprising:
   a housing having a heating chamber, an air inlet port and a air outlet port;
   a heating component disposed to produce heat within said heating chamber;
   fuel means for supplying a fuel air mixture to said heating component, so that when said heating component produces heat in said heating chamber a chimney effect circulates air through said housing; and
   safety shut-down means for shutting down said heating component when there is a deficiency of oxygen for said heating component,
   wherein said safety shut-down means includes an electrical on-off switch, an oxygen depletion sensor controlled by said on-off switch, and an audible alarm activated by said oxygen depletion sensor, whereby a change in radiant energy given off by said heating component indicates a lack of oxygen in the combustion air and is used as a safety cutoff point for said heating component, wherein said oxygen depletion sensor includes a primary air tube extending to said fuel air mixture supply means disposed to conduct air to said sensor, whereby the temperature of said sensor is kept below a critical point by a flow of cool air, and said sensor is prevented from overheating.

9. A portable heater and cooker system for heating enclosures and cooking, comprising:
   a housing having a heating chamber, an air inlet port and a air outlet port;
   a heating component disposed to produce heat within said heating chamber;
   fuel means for supplying a fuel air mixture to said heating component, so that when said heating component produces heat in said heating chamber a chimney effect circulates air through said housing; and
   safety shut-down means for shutting down said heating component when there is a deficiency of oxygen for said heating component,
   wherein said safety shut-down means includes an electrical on-off switch, an oxygen depletion sensor controlled by said on-off switch, and an audible alarm activated by said oxygen depletion sensor, whereby a chance in radiant energy given off by said heating component indicates a lack of oxygen in the combustion air and is used as a safety cutoff point for said heating component, wherein said oxygen depletion sensor includes a gripping element enabling said sensor to be removably attached adjacent to said heating component.

10. A portable heater and cooker system for heating enclosures and cooking, comprising a housing having a heating chamber, an air inlet port and an air outlet port, a heating component disposed to produce heat within said heating chamber, fuel means for supplying a fuel air mixture to said heating component, so that when said heating component produces heat in said heating chamber a chimney effect circulates air through said housing, safety shut-down means for shutting down said heating component when there is a deficiency of oxygen for said heating component, wherein the enclosure being heated has an enclosure opening formed therein, said system further including:

a removable ventilating panel having an air inlet opening; and securing means for securing said ventilating panel to said housing such that said ventilating panel will draw ambient air from outside the enclosure through said air inlet opening of said ventilating panel when said ventilating panel is placed against the enclosure opening formed in the enclosure being heated.

11. A portable heater and cooker system as recited in claim 10, further including a screen located over said air inlet opening of said ventilating panel, to prevent insects and small animals from entering through said air inlet opening.

12. A portable heater and cooker system as recited in claim 10, wherein said securing means includes:

a plurality of clips on said ventilating panel to engage with said lift handle; and a stabilizer rod extending between said ventilating panel and said housing.

13. A portable heater and cooker system as recited in claim 10, wherein said ventilating panel has a second air outlet opening;

said air outlet port has an outlet duct removably connected thereto, said outlet duct having a top end and a bottom end, to redirect and convey hot air from said housing; and said system includes an upwardly inclined vent tube having a lower end and an upper end, connected at said lower end to said top end of said outlet duct, said vent tube extending through said second air outlet opening in said ventilating panel, so as to vent out some hot air produced by said heating component.

14. A portable heater and cooker system as recited in claim 13, further including:

a first cover for capping said first air inlet opening in said ventilating panel; and a second cover for closing said second air outlet opening in said ventilating panel, so as to maintain the integrity of the enclosure when said portable heater and cooker system and said upwardly inclined vent tube are detached from said ventilating panel and said ventilating panel remains in place at the opening formed in the enclosure being heated.

15. A portable heater and cooker system as recited in claim 10, further including a cover for capping said air inlet opening in said ventilating panel, so as to maintain integrity of said housing when said ventilating panel is detached from said portable heater and cooker system and said ventilating panel remains in place at the opening formed in the enclosure being heated.

16. A portable heater and cooker system for heating enclosures and cooking, comprising:

a housing having a heating chamber, an air inlet port, and an air outlet port;

a heating component disposed to produce heat within said heating chamber;

a fuel supply disposed to supply fuel and combustion air to said heating component; and a safety shut-down mechanism for shutting down said heating component responsive to detecting a deficiency of oxygen in the combustion air, wherein said safety shut-down mechanism comprises a light intensity responsive photocell disposed to detect dimming of the glow of combustion within said heating component, an electrically operated valve disposed to shut off flow of fuel to said heating component responsive to detection of dimming of the glow of combustion by said photocell; and a circuit disposed to close said electrically operated valve responsive to detecting of dimming of the glow of combustion by said light intensity responsive photocell.

* * * * *